United States Patent
Rangarajan et al.

(10) Patent No.: US 11,507,174 B2
(45) Date of Patent: Nov. 22, 2022

(54) SYSTEM PHYSICAL ADDRESS SIZE AWARE CACHE MEMORY

(71) Applicant: QUALCOMM Incorporated, San Diego, CA (US)

(72) Inventors: Bharat Kumar Rangarajan, Bangalore (IN); Srinivas Turaga, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 16/799,936

(22) Filed: Feb. 25, 2020

(65) Prior Publication Data

US 2021/0263581 A1 Aug. 26, 2021

(51) Int. Cl.
| G06F 1/3234 | (2019.01) |
| G06F 1/30 | (2006.01) |
| G06F 9/4401 | (2018.01) |
| G06F 12/0895 | (2016.01) |

(52) U.S. Cl.
CPC .............. *G06F 1/3275* (2013.01); *G06F 1/30* (2013.01); *G06F 9/4401* (2013.01); *G06F 12/0895* (2013.01); *G06F 2212/222* (2013.01)

(58) Field of Classification Search
CPC ........ G06F 1/3275; G06F 1/30; G06F 9/4401; G06F 12/0895; G06F 2212/222
See application file for complete search history.

(56) References Cited

U.S. PATENT DOCUMENTS

| 6,134,577 | A | * | 10/2000 | Straub | G06F 9/445 718/100 |
| 9,178,178 | B2 | * | 11/2015 | Lee | H01L 27/32 |
| 10,396,799 | B1 | * | 8/2019 | Manda | H03K 19/17732 |
| 10,867,655 | B1 | * | 12/2020 | Harms | G11C 11/221 |
| 2002/0112126 | A1 | * | 8/2002 | Hayakawa | G06F 12/0864 711/128 |
| 2004/0022116 | A1 | * | 2/2004 | Bell | G11C 11/408 365/227 |
| 2008/0104324 | A1 | * | 5/2008 | Raghuvanshi | G06F 12/0802 711/122 |
| 2011/0219190 | A1 | * | 9/2011 | Ng | G06F 12/0862 711/122 |
| 2013/0246825 | A1 | * | 9/2013 | Shannon | G06F 12/0846 713/324 |
| 2013/0326157 | A1 | | 12/2013 | Hara | |
| 2014/0122824 | A1 | * | 5/2014 | Lewsey | G06F 1/3275 711/170 |
| 2016/0109924 | A1 | * | 4/2016 | Nomura | G06F 1/3287 327/535 |

FOREIGN PATENT DOCUMENTS

| KR | 101490072 B1 | 2/2015 |
| WO | WO-0150272 A1 | 7/2001 |

OTHER PUBLICATIONS

International Search Report and Written Opinion—PCT/US2021/019591—ISA/EPO—dated Jun. 10, 2021.

* cited by examiner

*Primary Examiner* — Paul Yen
(74) *Attorney, Agent, or Firm* — Qualcomm Incorporated

(57) ABSTRACT

In certain aspects, a tag memory comprises a plurality of non-configurable tag columns configured to be powered on during a normal operation; and a plurality of configurable tag columns, wherein a first portion of the plurality of configurable tag columns is configured to be powered off during the normal operation and a second portion of the plurality of configurable tag columns is configured to be powered on during the normal operation.

21 Claims, 5 Drawing Sheets

SYSTEM PHYSICAL ADDRESS SIZE AWARE CACHE MEMORY

BACKGROUND

Field

Aspects of the present disclosure relate to cache memory, and more particularly, to configurable cache tag memory for power optimization.

Background

Cache Memory is a special high-speed memory. It is used to speed up and synchronize with high-speed CPU. Cache memory is an extremely fast memory type that acts as a buffer between main memory (often DDR or LPDDR memory) and the CPU. The cache holds frequently requested data and instructions so that they are immediately available to the CPU when needed. Most CPUs have different independent caches, including instruction and data caches, where they are usually organized as a hierarchy of more cache levels (L1, L2, L3, L4, etc.).

Data are transferred between memory and cache in blocks of fixed size, called cache lines or cache blocks. When a cache line is copied from memory into the cache, a cache entry is created. The cache entry will include the copied data as well as the requested memory location, called a tag. The tag contains part of the address of the actual data fetched from the main memory. An effective memory address which goes along with the cache line is split (from MSB to LSB) into the tag, the index, and the block offset. The index describes which cache set that the data has been put in. The block offset specifies the desired data within the stored data block within the cache row. The tag contains the most significant bits of the address, which are checked against all ways in the current set (the set has been retrieved by index) to see if this set contains the requested address. If it does, a cache hit occurs.

FIG. 1 illustrates a sample memory address mapping according to certain aspects of the present disclosure. The address 100 is for a 32-KB cache with 4-way set associativity, 64-byte block size, 40-bit physical address. There are 6 bits (5:0) for offset for 64-byte block. There are 512 cache blocks and 128 sets, hence 128 indices, which require 7 bits (12:6). The remaining bits (39:13) are the tag field.

In computing, a physical address is a memory address that is represented in the form of a binary number on the address bus circuitry in order to enable the data bus to access a particular storage cell of a main memory, or a register of memory mapped I/O device. The physical address space is the total number of uniquely-addressable physical address (memory locations) at a physical level (i.e., in the RAM). The maximum size of the physical memory is limited by the width of the address bus. A computing device with 36-bit physical address can support a main memory up to 64 GB.

The actual physical address size used, however, is often smaller. The actual physical address size depends on the main memory density and peripheral device address map. For example, a processing unit in a system-on-chip (SoC) may support physical address up to 40 bits, which implies it can support a main memory up to 1 TB. The device incorporating the SoC, however, may be with a DDR of 4 GB. Therefore, only lower 32 bits of the physical address are used. The signals at the upper 8 bits are irrelevant in memory read or write. The power consumption due to toggling of those bits is thus wasted. In addition, power consumption by circuitry for deriving those signals and processing those signals subsequently is wasted, too. Therefore, it is beneficial to reduce the power consumption of the unused tag bits in a cache memory.

SUMMARY

The following presents a simplified summary of one or more implementations to provide a basic understanding of such implementations. This summary is not an extensive overview of all contemplated implementations, and is intended to neither identify key nor critical elements of all implementations nor delineate the scope of any or all implementations. The sole purpose of the summary is to present concepts relate to one or more implementations in a simplified form as a prelude to a more detailed description that is presented later.

In one aspect, a tag memory comprises a plurality of non-configurable tag columns configured to be powered on during a normal operation; and a plurality of configurable tag columns, wherein a first portion of the plurality of configurable tag columns is configured to be powered off during the normal operation and a second portion of the plurality of configurable tag columns is configured to be powered on during the normal operation.

In another aspect, a method for operating a tag memory comprises powering on a plurality of non-configurable tag columns during a normal operation; powering off a first portion of a plurality of configurable tag columns during the normal operation; and powering on a second portion of the plurality of configurable tag columns during the normal operation.

To accomplish the foregoing and related ends, one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various aspects and is not intended to represent the only aspects in which the concepts described herein may be practiced. The detailed description includes specific details for the purpose of providing an understanding of the various concepts. However, it will be apparent to those skilled in the art that these concepts may be practiced without these specific details. In some instances, well-known structures and components are shown in block diagram form in order to avoid obscuring such concepts.

A processing unit, such as a general purpose CPU or a DSP, in a SoC provides support to a maximum physical address size. A system integrating the SoC may have system memory physical address size smaller than the maximum physical address supported by the SoC. Significant energy and power are wasted in storing the unused physical address bits in the tag RAM in the SoC at all cache levels. Even if the page table configurations can ensure that there would not be toggles on the upper unused physical address bits, dynamic (clock) power and leakage power get wasted for these bits and their associated circuitry. Therefore, it is beneficial to make these bits configurable to save dynamic and leakage power.

Figure 1:
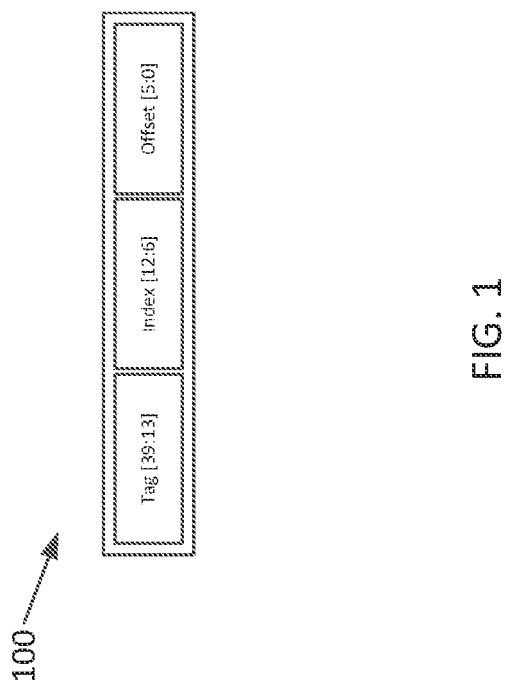
FIG. 1 illustrates a sample memory address mapping according to certain aspects of the present disclosure.
Figure 2:
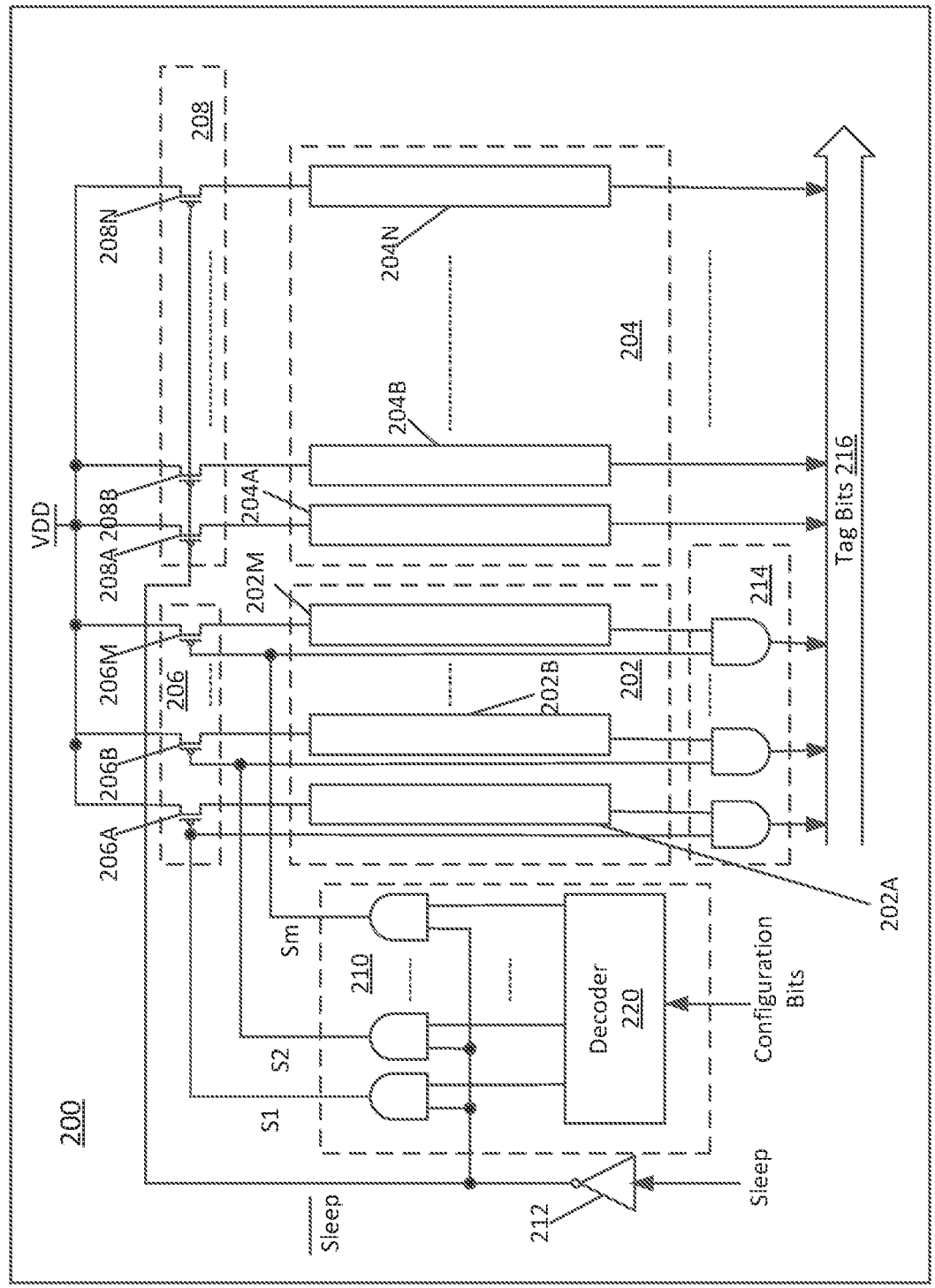
FIG. 2 illustrates an exemplary tag memory according to certain aspects of the present disclosure.

FIG. 2 illustrates an exemplary tag memory according to certain aspects of the present disclosure. The tag memory 200 comprises two parts. The first part 202 comprises a plurality of configurable tag columns for the upper bits of a tag physical address, 202A, 202B, . . . , 202M. The second part 204 comprises a plurality of non-configurable tag columns for the lower bits of the tag physical address, 204A, 204B, . . . , 204N. In addition, the tag memory 200 comprises a plurality of configurable power switches 206 for the first part 202 and a plurality of non-configurable power switches 208 for the second part 204. Each configurable tag column of the tag memory 200 has a power switch, such as a power switch 206A for the tag column 202A, a power switch 206B for the tag column 202B, . . . , and a power switch 206M for the tag column 202M. Each non-configurable tag column of the tag memory 200 may have a power switch, too, such as a power switch 208A for the tag column 204A, a power switch 208B for the tag column 204B, . . . , and a power switch 208N for the tag column 204N. The power switches 206 and 208 couple a supply power VDD to each tag columns 202A, 202B, . . . , 202M and 204A, 204B, . . . , 204N. For illustration purpose, the power switches 206 and the power switches 208 each is represented by a PMOS transistor. A "0" logic gate signal turns the power switch on and a "1" logic gate signal turns it off. Other devices that gate the power to the tag columns are possible.

The first part 202 comprises the most significant bits of a tag that may not be used by the system memory. Those bits are configurable. For example, if the SoC supports 40-bit physical address, and it determines that the system may have a system memory with physical address size as small as 32 bits, then the 8 most significant bits may be set to be configurable. If the system memory physical address size is 32 bits, then all 8 most significant bits [39:32] will be configured to be powered off during a normal operation. If the system memory physical address size is 36 bits, then 4 most significant bits [39:36] are configured to be powered off during the normal operation, while the next 4 bits [35:32] are configured to be powered on during the normal operation. The remaining tag bits of the tag field, [31:13] (for illustration purpose only, assuming 27 bits tag), are always powered on during the normal operation.

Therefore, the plurality of configurable tag columns in the first part 202 may be further divided into two portions: a first portion of the plurality of configurable tag columns are the most significant bits of the tag and a second portion of the plurality of configurable tag columns are the remaining bits in the first part 202. The first portion of the plurality of configurable tag columns are bits that are not part of the system memory physical address and can be powered off during the normal operation. The second portion of the plurality of configurable tag columns, however, are part of the system memory physical address and should be powered on during the normal operation.

The configuration of the power status of the plurality of configurable tag columns 202A, 202B, . . . , 202M is done through the control of the plurality of configurable power switches 206A, 206B, . . . , 206M. For the first portion of the plurality of configurable tag columns, those most significant tag bits that are not part of the system memory physical address, the corresponding power switches will be turned off, decoupling the supply power VDD from the tag columns during the normal operation as well as during power collapse. Significant power saving, including leakage power saving, is thus achieved. For example, for a SoC supporting 40-bit physical address, if the system memory requires only 36-bit physical address, the 4 most significant bits tag columns may be powered off by turning off the corresponding power switches.

To selectively turn on or turn off the plurality of configurable power switches 206A, 206B, . . . , 206M, the control terminals of the plurality of configurable power switches 206A, 206B, . . . , 206M are coupled to respective one of a plurality of switch control signals S1, S2, . . . , Sm. The plurality of switch control signals S1, S2, Sm is provided by a configuration circuit 210. As a sample embodiment, the configuration circuit 210 comprises a decoder 220. The decoder 220 receives configuration bits as input and output the decoded switch control signals S1, S2, . . . , Sm. For example, if there are 3 configuration bits, then there may be 8 switch control signals S1, S2, . . . , Sm. Other decoding schemes are possible. For example, a mapping table can be provided and implemented between the configuration bits and the control signals. The mapping table may be programmable.

The configuration bits may be programmed and reside in a register. Alternatively, the configuration bits may be obtained from IO pins. The IO pins are coupled to a power supply or ground to set the logic value of the configuration bits. The IO pins configuration provides flexibility for system designers to set up the configuration bits until the time when the system memory size is determined. The configuration bits may be one-time programmable through, e.g., eFuse, EEPROM, etc. Other means are possible to define the configuration bits. The configuration bits may be set by secure software during boot up and would not be changed until the next reset cycle. This is to ensure that these bits are not changed during mission mode operations. Also these bits should be programmed even before caches and MMUs are enabled.

For a cache that is power collapsible, the configuration circuit 210 further receives the power down control signal, Sleep. In power collapse, the power down control signal, Sleep, is asserted (Sleep="1"), the tag memory 200 will be powered off by turning off all the power switches 206A, 206B, . . . , 206M and 208A, 208B, . . . , 208N. For a PMOS transistor power switch, a complementary power down control signal, $\overrightarrow{Sleep}$, may be generated through an inverter 212. The complementary power down control signal, $\overrightarrow{Sleep}$, is also provided to the configuration circuit 210, where it couples with each of the decoded signals (e.g., by logic AND operation as illustrated in FIG. 2) to generate the switch control signals S1, S2, . . . , Sm. Therefore, when the power down control signal, Sleep, is asserted (logic "1"), all power switches 206A, 206B, . . . , 206M and 208A, 208B, . . . , 208N are turned off. When the power down control signal, Sleep, is de-asserted (logic "0"), only the few most significant bit column power switches are turned off. That is, only a first portion of the plurality of configurable power switches, ones coupled to the first portion of the plurality of configurable tag columns, is turned off. Other power switches are turned on, providing power to each column. Those power switches include a second portion of the plurality of configurable power switches, ones coupled to the second portion of the plurality of configurable tag columns, and a third portion of the plurality of non-configurable power switches, if any, those coupled to the plurality of the non-configurable tag columns. The number of the most significant bit tag columns to be turned off depends on the configuration bits and decoding scheme.

To ensure proper subsequent operation when the unused physical address bit tag columns are powered off by the power switches, in an exemplary embodiment, a clamp logic 214 may be added at the outputs of the plurality of configurable tag columns 202. The clamp logic 214 receives the switch control signals S1, S2, . . . , Sm, and gate the outputs of the plurality of configurable tag columns 202A, 202B, . . . , 202M with, e.g., AND logic operation. For example, the switch control signal S1 gates the output of the configurable tag column 202A, the switch control signal S2 gates the output of the configurable tag column 202B, . . . , the switch control signal Sm gates the output of the configurable tag column 202M. The clamp logic 214 is configured to pass each output of the second portion of the plurality of configurable tag columns and pass a fixed logic value for each output of the first portion of the plurality of configuration tag columns by, e.g., AND logic gating during the normal operation. The gated outputs of the configurable tag columns 202A, 202B, . . . , 202M, together with the outputs of the non-configurable columns 204A, 204B, . . . , 204N, form the read out tag bits 216.

Figure 3:
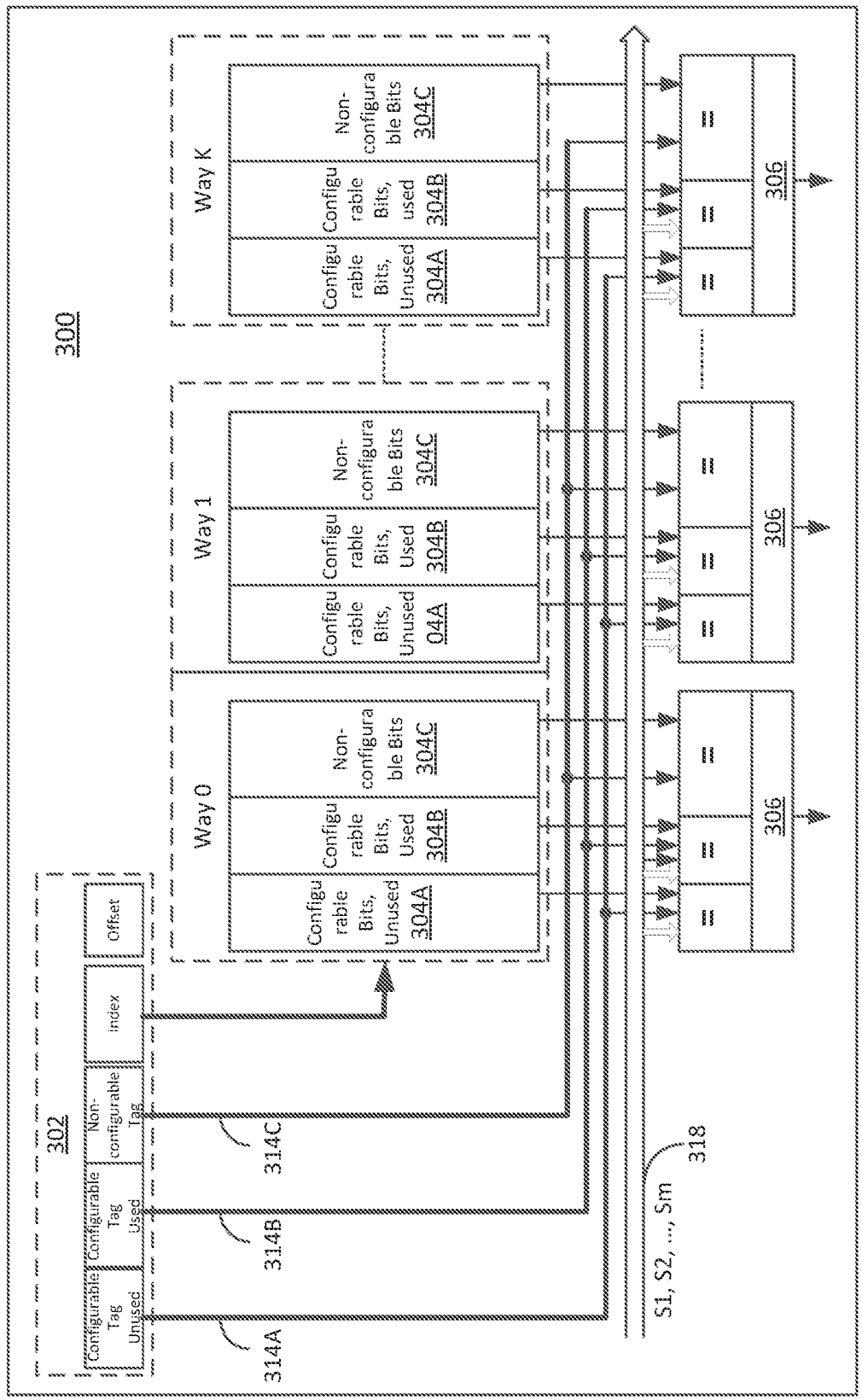
FIG. 3 illustrates an exemplary cache tag comparison according to certain aspects of the present disclosure.

When there are unused most significant bits in the tag, the subsequent comparison for these bits for determination of cache hit or miss is unnecessary and can be disabled, further saving power consumption. FIG. 3 illustrates an exemplary cache tag comparison according to certain aspects of the present disclosure. The cache tag system 300 comprises K-way cache, Way 0, Way 1, . . . , Way K. In each way, there are a plurality of non-configurable tag columns for non-configurable bits 304C, a second portion of a plurality of configurable tag columns for used configurable bits 304B, and a first portion of the plurality of configurable tag columns for unused configurable bits 304A. For example, if the SoC supports 40-bit physical address, and it determines that the system may have system memory with physical address size as small as 32 bits, then the tag columns for 8 most significant bits may be set to be configurable. If the system memory physical address size is 37 bits, then the tag columns for 3 most significant bits [39:37] are unused configurable bits and may be powered off during a normal operation, while the tag columns for the next 5 bits [36:32] are used configurable bits and are powered on during the normal operation. The tag columns for the remaining bits of the tag field, [31:13] (for illustration purpose only, assuming 27 bits tag), are non-configurable and are always powered on during the normal operation.

The tag system 300 also comprises a register 302 contains the memory address. For a SoC supporting 40-bit physical address, the address will be at least 40 bits long. The memory address contains offset, index, and tag. The memory tag may include 3 portions: non-configurable bits 314C, used configurable bits 314B, and unused configurable bits 314A. The memory tag bits 314A, 314B, and 314C are compared with tag bits read from the tag columns 304A, 304B, and 304C in each way by a tag comparator 306. For the configurable bits, the comparison may be turned on or off by the switch control signals S1, S2, Sm through signal lines 318. The switch control signals S1, S2, Sm are signals generated by the configuration circuit 210. If the configurable tag bits are unused, the comparison is unnecessary and will not be done and the default outcome will be a match for those bits. If the configurable tag bits are used, the comparison will be enabled like those non-configurable bits.

Figure 4:
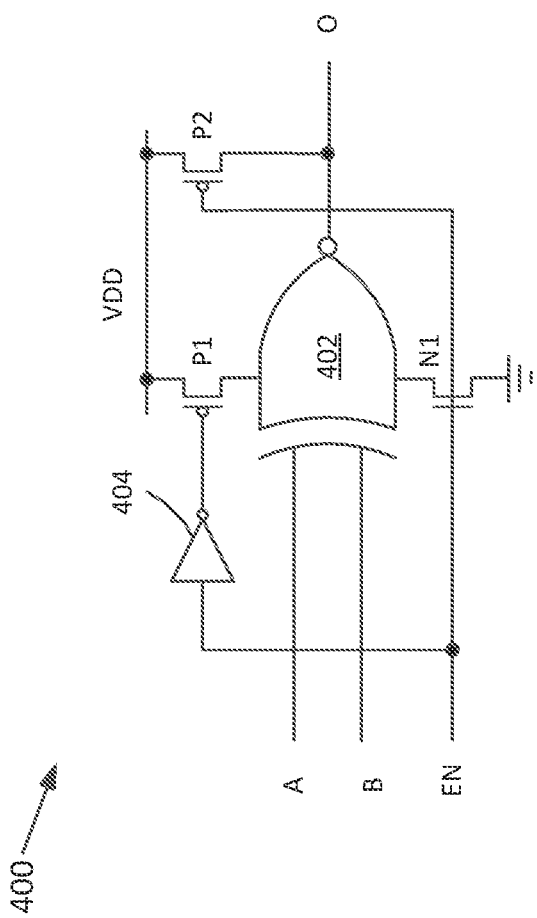
FIG. 4 illustrates an exemplary bit comparator according to certain aspects of the present disclosure.

FIG. 4 illustrates an exemplary bit comparator according to certain aspects of the present disclosure. The tag comparator 306 comprises a plurality of bit comparators 400 for configurable tag bits. The bit comparator 400 comprises an XNOR 402 with two compared bits A and B. The XNOR 402 is coupled to a power supply VDD through a head switch P1 and ground through a foot switch N1. The foot switch N1 and the head switch P1 are controlled by complementary enable signals, EN and its inversion (e.g., by inverter 404). Further, the comparison output, O, is held to logic high by a keeper P2 when the enable signal, EN, is off. Applying the bit comparator 400 in the tag comparator 306, the two compared bits A and B may couple to a configurable tag bit of the memory tag 314A and 314B and a corresponding configurable tag bit read from the configurable tag columns 304A and 304B. The enable signal, EN, couples to a corresponding switch control signals S1, S2, . . . , Sm.

Figure 5:
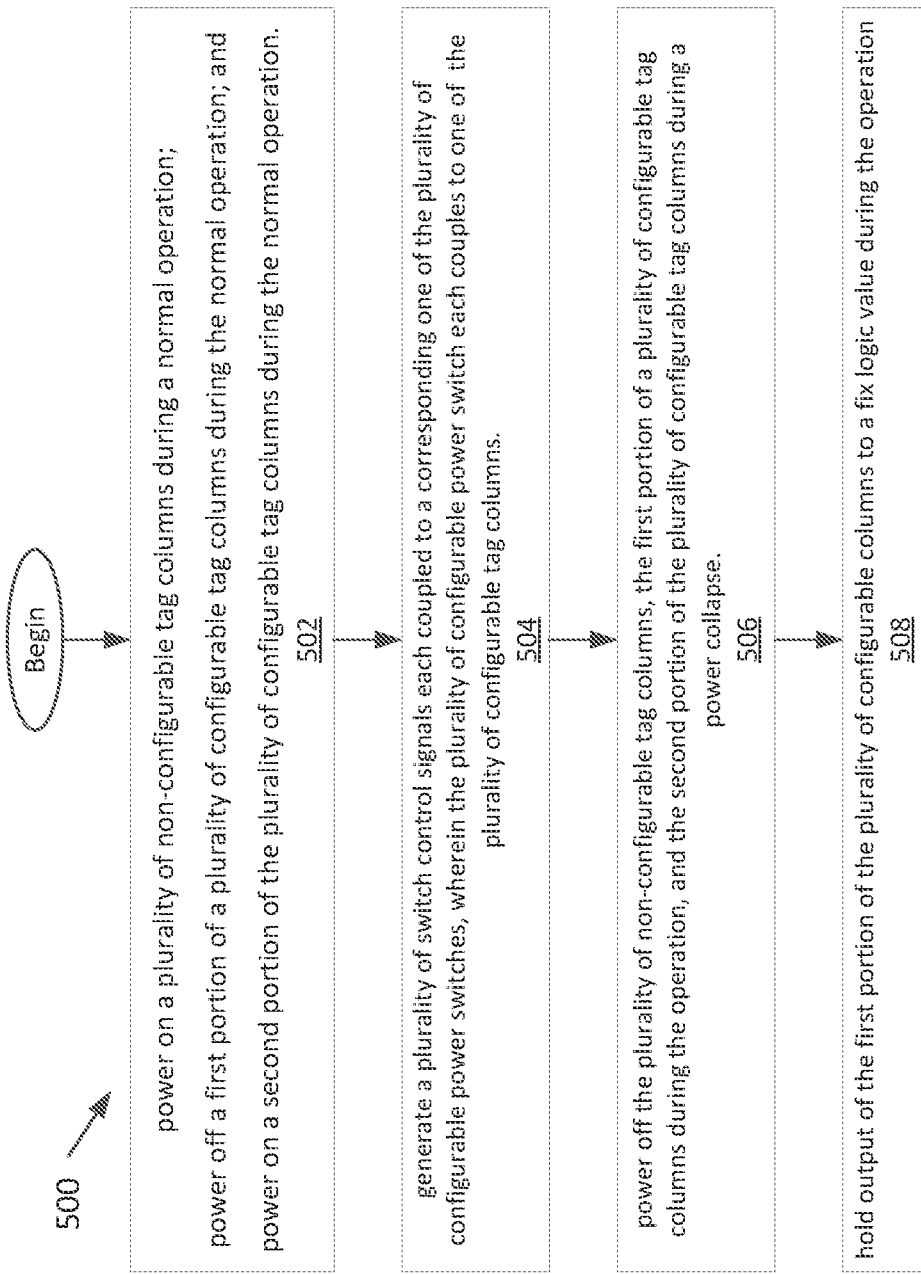
FIG. 5 illustrates an exemplary method operating a tag memory according to certain aspects of the present disclosure.

FIG. 5 illustrates an exemplary method 500 operating a tag memory according to certain aspects of the present disclosure. In a normal operation, at 502, a plurality of non-configurable tag columns (e.g., the plurality of non-configurable tag columns 204A, 204B, . . . , 204N or 304C) is powered on. While a first portion of the plurality of configurable tag columns (e.g., the first portion of the plurality of configurable tag columns 202A, 202B, . . . , 202M or 304A) is powered off and a second portion of the plurality of configurable tag columns (e.g., the second portion of the plurality of configurable tag columns 202A, 202B, . . . , 202M or 304B) is powered on. The first portion of the plurality of configurable tag columns contains the most significant bits of a physical address and the second portion of the plurality of configurable tag columns contains the next most significant bits of the physical address. A system memory may not use full size of the physical address available by the SoC. Therefore, a portion of the most significant bits of the physical address may not be need. Relevant circuitry may be turned off to save power consumption.

The power on or off may be controlled through a plurality of power switches. The tag memory comprises a plurality of configurable power switches (e.g., the plurality of configurable power switches 206A, 206B, . . . , 206M) coupled to the plurality of configurable tag columns, wherein each of the plurality of configurable tag columns couples to a supply power (e.g., the supply power VDD) through a corresponding one of the plurality of configurable power switches, and each of the plurality of configurable tag columns is configured to be turned on or off by turning on or off the corresponding one of the plurality of configurable power switches. Furthermore, the tag memory comprises a plurality of non-configurable power switches (e.g., the plurality of non-configurable power switches 208A, 208B, . . . , 208N) coupled to the plurality of non-configurable tag columns.

The control signals for the plurality of configurable power switches may be generated by a configuration circuit (e.g., the configuration circuit 210). This is done at 504 where a plurality of switch control signals (e.g., the plurality of switch control signals S1, S2, ..., Sm) is generated, each coupled to the corresponding one of the plurality of configurable power switches. Each of the plurality of switch control signals controls on or off of the corresponding one of the plurality of configurable power switches.

In a power collapse event, the method 500 may power off the plurality of non-configurable tag columns, the first portion of a plurality of configurable tag columns, and the second portion of the plurality of configurable tag columns at 506.

The method 500 may further hold output of the first portion of the plurality of configurable columns to a fix logic value during the normal operation at 508 so that the subsequent circuitry won't function erratically.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A tag memory, comprising:
a plurality of non-configurable tag columns configured to be powered on during a normal operation, wherein the plurality of non-configurable tag columns corresponds to lower bits of a tag physical address;
a plurality of configurable tag columns, wherein the plurality of configurable tag columns corresponds to upper bits of the tag physical address, and wherein a first portion of the plurality of configurable tag columns is configured to be powered off during the normal operation and a second portion of the plurality of configurable tag columns is configured to be powered on during the normal operation, and
a plurality of configurable power switches coupled to the plurality of configurable tag columns, wherein each one of the plurality of configurable tag columns couples to a supply power through a corresponding one of the plurality of configurable power switches, and one each of the plurality of configurable tag columns is configured to be powered on or off by turning on or off the corresponding one of the plurality of configurable power switches.

2. The tag memory of claim 1, wherein each of the plurality of configurable power switches comprises a PMOS transistor.

3. The tag memory of claim 1, further comprising a configuration circuit configured to provide a plurality of switch control signals each coupled to the corresponding one of the plurality of configurable power switches, wherein each of the plurality of switch control signals controls on or off the corresponding one of the plurality of configurable power switches.

4. The tag memory of claim 3, wherein the configuration circuit comprises a decoder to generate the plurality of switch control signals from configuration bits.

5. The tag memory of claim 4, wherein the configuration bits reside in a register.

6. The tag memory of claim 4, wherein the configuration bits are configured to be set up during boot up.

7. The tag memory of claim 1, wherein the first portion of the plurality of configurable tag columns contains most significant bits of a physical address and the second portion of the plurality of configurable tag columns contains next most significant bits of the physical address.

8. The tag memory of claim 7, wherein the plurality of non-configurable tag columns contains remaining bits of a tag field.

9. The tag memory of claim 1 further comprising a plurality of non-configurable power switches coupled to the plurality of non-configurable tag columns, wherein each of the plurality of non-configurable tag columns couples to a supply power through corresponding one of the plurality of non-configurable power switches.

10. The tag memory of claim 9, wherein the plurality of non-configurable tag columns is configured to be powered on during the normal operation and powered off during a power collapse through the plurality of non-configurable power switches.

11. The tag memory of claim 10, wherein the first portion of the plurality of configurable tag columns is configured to be powered off during the normal operation and the second portion of the plurality of configurable tag columns is configured to be powered on during the normal operation, and wherein both the first portion and the second portion of the plurality of configurable tag columns are configured to be powered off during the power collapse.

12. The tag memory of claim 1 further comprising a clamp logic coupled to outputs of the plurality of configurable tag columns, wherein the clamp logic is configured to pass each output of the second portion of the plurality of configurable tag columns and pass a fixed logic value for each output of the first portion of the plurality of configuration tag columns.

13. The tag memory of claim 12, wherein the clamp logic comprises a plurality of 2-input AND logic gates, where each one of the plurality of 2-input AND logic gates receives one of the output of the plurality of configurable tag columns and a corresponding switch control signal.

14. The tag memory of claim 1 further comprising a first plurality of bit comparators each coupled to each output of the first portion of the plurality of configurable tag columns, wherein the first plurality of bit comparators is configured to power off during the normal operation.

15. The tag memory of claim 14 further comprising a second plurality of bit comparators each coupled to each output of the second portion of the plurality of configurable tag columns and a third plurality of bit comparators each coupled to each output of the plurality of non-configurable tag columns, wherein the second plurality of bit comparators and the third plurality of the bit comparators are configured to power on during the normal operation.

16. The tag memory of claim 1 is a part of level 1 cache.

17. A method for operating a tag memory, comprising:
powering on a plurality of non-configurable tag columns during a normal operation, wherein the plurality of non-configurable tag columns corresponds to lower bits of a tag physical address;
powering off a first portion of a plurality of configurable tag columns during the normal operation, wherein the plurality of configurable tag columns corresponds to upper bits of the tag physical address; and
powering on a second portion of the plurality of configurable tag columns during the normal operation,
wherein the tag memory comprises a plurality of configurable power switches coupled to the plurality of configurable tag columns, wherein each of the plurality of configurable tag columns couples to a power supply through a corresponding one of the plurality of configurable power switches, and each of the plurality of configurable tag columns is configured to be powered on or off by turning on or off the corresponding one of the plurality of configurable power switches.

18. The method of claim 17 further comprising generating a plurality of switch control signals each coupled to the corresponding one of the plurality of configurable power switches, wherein each of the plurality of switch control signals controls on or off of the corresponding one of the plurality of configurable power switches.

19. The method of claim 17, wherein the first portion of the plurality of configurable tag columns contains most significant bits of a physical address and the second portion of the plurality of configurable tag columns contains next most significant bits of the physical address.

20. The method of claim 17 further comprising powering off the plurality of non-configurable tag columns, the first portion of the plurality of configurable tag columns, and the second portion of the plurality of configurable tag columns during a power collapse.

21. The method of claim 17 further comprising holding outputs of the first portion of the plurality of configurable columns to a fix logic value during the normal operation.

* * * * *